United States Patent Office 3,346,557
Patented Oct. 10, 1967

3,346,557
PROCESS FOR OXYALKYLATING
SOLID POLYOLS
John T. Patton, Jr., Wyandotte, and Walter F. Schulz, Southgate, Mich., assignors to Wyandotte Chemicals Corporation, Wyandotte, Mich., a corporation of Michigan
No Drawing. Filed June 4, 1965, Ser. No. 461,502
The portion of the term of the patent subsequent to June 22, 1982, has been disclaimed
6 Claims. (Cl. 260—209)

This application is a continuation-in-part of patent application Ser. No. 21,874, filed Apr. 13, 1960, now U.S. Patent No. 3,190,927.

This invention relates to a process for oxyalkylating solid polyols. In a more specific aspect, this invention relates to a method for producing high molecular weight products by reacting a normally-solid polyol with an alkylene oxide to produce products that are substantially free of glycols or homopolymers of the alkylene oxide used.

Methods for reacting solid polyols, such as pentaerythritol, with alkylene oxides, such as ethylene oxide, propylene oxide and butylene oxide, have been known for a considerable period of time, but the problems in this area are quite apparent from a review of the pertinent patents that have issued. Thus, Schmidt et al., U.S. 1,922,459 (1933), disclose the reaction of pentaerythritol with ethylene oxide by heating the reactants in an autoclave in the presence of boric anhydride for about 20 hours at 125° C. The incompleteness of the reaction is shown by the disclosure by Schmidt et al. that unreacted ethylene oxide was removed from the reaction products. Further development in catalysts for this reaction is disclosed by Bowman et al., U.S. 2,401,743 (1946), who disclose the reaction of pentaerythritols with alkylene oxides in the presence of a broad group of organic acids and organic acid anhydrides, such as acetic acid or acetic anhydride. Again reaction times were long and incomplete since Bowman et al. disclose that unreaction ethylene oxide was removed from the reaction product.

Brown, U.S. 2,450,079 (1948), discloses the reaction of polyhydric alcohols having at least 3 hydroxyl groups, such as pentaerythritol, with alkylene oxides by mixing the polyol with a substantial proportion of water and then reacting the mixture with an olefin oxide. The well-recognized reaction of water with an alkylene oxide interferes in this process and the product is a mixture of glycols, polymers of the alkylene oxide used, adducts of the polyol and the alkylene oxide and water. The whole problem of reacting normally-solid polyols with alkylene oxides is discussed in Monson et al., U.S. 2,766,292 (1956). Monson et al. points out that the polyols under consideration, although inherently oxyalkylation-susceptible, are solids which are substantially insoluble in any of the oxyalkylation-resistant solvents available for use in the preparation of oxyalkylated derivatives. Monson et al. point out that water is not an acceptable solvent for use in oxyalkylation processes because water reacts with such alkylene oxides to produce polyglycols during oxyalkylation. The problem is further complicated by the fact that the normally-solid, oxyalkylation-susceptible solids cannot be used in undiluted form in the oxyalkylation processes known to date or simply by liquefying such solid polyols by heating prior to introduction of the oxyalkylating agent because they undergo partial decomposition as they melt.

The problems inherent in using oxyalkylation-resistant solvents, such as xylene, in these processes is disclosed by De Groote, U.S. 2,554,667 (1951), who notes that powdered dipentaerythritol is not soluble in xylene. De Groote suggests that dipentaerythritol can be reacted with an alkylene oxide by employing enough xylene to give a paste or suspension which can be stirred in an autoclave along with the basic oxyalkylation catalyst; however, De Groote notes that there would be a problem in large-scale manufacture in handling such an initial pasty suspension or mass. A recent suggestion for helping to solve the difficulties in reacting a normally-solid polyol with an alkylene oxide is given by Anderson, U.S. 2,902,478 (1959), who discloses that high-melting, heat-sensitive polyols that are substantially insoluble in alkylene oxides can be oxyalkylated at temperatures below their melting points and decomposition temperatures and in the absence of solvent by the use of trimethylamine as a catalyst. Anderson discloses that trimethylamine catalyzes the reaction of alkylene oxides with hydroxyl compounds and also solvates or activates the solid polyols so that they react readily with alkylene oxides at low temperatures. The use of a trimethylamine catalyst is not the solution the art is seeking, either, because it is a difficult reaction to carry out safely since the reaction, as can be seen from the patent, is a vigorous exothermic reaction.

Accordingly, it is a purpose of this invention to provide an improved method for reacting a high-melting, oxyalkylation-susceptible, organic polyol with an alkylene oxide wherein products substantially free of polymers of the alkylene oxide used and substantially free of glycols are produced.

This purpose and others have been accomplished by the method of the invention which is based on the discoveries that an adduct of at least one alkylene oxide and a high-melting, oxyalkylation-susceptible, organic polyol in the proportion of 0.5 to 1.5 moles of alkylene oxide per hydroxyl radical of said polyol is a completely suitable solvent or reaction medium for said polyol, itself, and that the polyol and the alkylene oxide reactant can be added to the adduct in the presence of an amine catalyst, selected from the group consisting of tetramethylethylenediamine, tetramethylbutanediamine, tetramethylguanidine, trimethylpiperazine and tributylamine in the absence of oxyalkylation-resistant solvents or water. Stated broadly, the process includes mixing and heating an alkylene oxide and a high-melting, oxyalkylation-susceptible organic polyol having from 3 to 8 hydroxyl radicals per molecule with an adduct of 0.5 to 1.5 moles per hydroxyl radical of the polyol of at least one alkylene oxide and said polyol and the amine catalyst.

The process of the invention in commercial practice amounts to generally a multistage process. The first stage of the process involves contacting a high-melting, oxyalkylation-susceptible, organic polyol having from 3 to 8 hydroxyl radicals per molecule with water, the amine catalyst and at least one alkylene oxide at a low oxyalkylation temperature. The conditions observed and proportions of reactants in the first stage are very important. About 0.5 to 1.5 moles of the alkylene oxide are used per hydroxyl radical of the polyol. The product of the first stage is the adduct that is used thereafter as the solvent and reaction medium for subsequent reaction with the alkylene oxide to produce the product that is desired. Although, as stated, the adduct produced in the first stage is usually the adduct that is used as the reaction medium for further reaction between the polyol and alkylene oxide, a low molecular weight adduct of one polyol, such as pentaerythritol and 2 moles of propylene oxide, can be used as the reaction medium for reaction of a different polyol of the type contemplated herein, such as dipentaerythritol, and an alkylene oxide. Although the melting point of the polyols under consideration is relatively high, that is, greater than 100° C., an adduct of such a polyol with 0.5 to 1.5 moles of an alkylene oxide per hydroxyl radical of the polyol has a greatly reduced melting point and is usually a liquid under normal conditions. The reason for this is probably that the symmetry of the polyol molecule is broken when such an adduct of the polyol is formed resulting in a lower melting product. It is desirable to use the lowest possible proportion of alkylene oxide in the first stage that is necessary to reduce the melting point of the polyol so that the alkylene oxide reacts with the hydroxyl groups of the polyol rather than with water which is present in the system or with itself to form polymers or glycols. After the initial adduct is prepared as described above, water and volatile materials are stripped from the adduct.

The advantages of this process should be quite apparent. Only small amounts of glycol or alkylene oxide polymers, that are undesired by-products, are formed in the first stage because of the proportions of reactants used and the low oxyalkylation temperature that is employed. The small amount of such undesired by-products that is produced is diluted to an insignificant amount by the additional reactants, polyol and alkylene oxide, that are used in the second and any subsequent stages of the reaction. Although a two-stage reaction is often adequate, increasing the number of stages further decreases the amount of undesired by-products which are present. The second and subsequent stages of the reaction are carried out with no water or other solvent which contribute to impurities and undesired by-products.

The polyols that are used in the process are high-melting, oxyalkylation-susceptible, organic polyols having from 3 to 8 hydroxyl radicals per molecule. Pentaerythritol is a prime example since it has a melting point of 261° C. and has 4 hydroxyl groups. Other examples of such polyols are trimethylolethane having a melting point of 202° C. and 3 hydroxyl groups, dipentaerythritol having a melting point of about 222° C. and 6 hydroxyl groups, tripentaerythritol having a melting point of 248–250° C. and 8 hydroxyl groups, inositol having 6 hydroxyl groups, the dextro form of which having a melting point of 247° C. and the levo form of which having a melting point of 238° C., disaccharides such as sucrose having a melting point of 160° C. and 8 hydroxyl groups, monosaccharides such as glucose having a melting point of 147° C. and 5 hydroxyl groups, sorbitol having a melting point of 111° C. and 6 hydroxyl groups and fructose having a melting point of 105° C. and 5 hydroxyl groups, and the like.

The alkylene oxides that are used are the vicinal oxides, that is, those in which the oxygen atom is attached to two adjacent aliphatic carbon atoms. Mixtures of such alkylene oxides can also be used and examples of the alkylene oxide reactants are ethylene oxide, 1,2-propylene oxide, 1,2- and 2,3-butylene oxides, isobutylene oxide, butadiene monoxide, styrene oxide, cyclohexene oxide, butadiene dioxide, methyl glycidyl ether, phenyl glycidyl ether, and the like and mixtures thereof. A distinction is made, however, between the use of ethylene oxide and any other of the vicinal alkylene oxides listed and referred to. Ethylene oxide can be used in the process of the invention but it is less desirable than the alkylene oxides having at least 3 carbon atoms because, when ethylene oxide reacts with the polyol, the hydroxyl group produced when the ethylene oxide ring opens is a primary hydroxyl group whereas the hydroxyalkyl product obtained using the higher alkylene oxides contains secondary hydroxyl groups. The efficacy of the first stage of the process is based, to a large extent, on the higher reactivity of alkylene oxides with the primary hydroxyl groups of the polyol, itself, and, when ethylene oxide is used, it is just as likely to react with the primary hydroxyl group of a hydroxyethyl radical as with the primary hydroxyl group of the polyol. The use of higher alkylene oxides insures even distribution about the molecule of the starting polyol of the hydroxyalkyl groups since the higher alkylene oxides preferentially react with the primary hydroxyl group of the starting polyol rather than the secondary hydroxyl groups in the hydroxyalkyl radicals resulting from ring opening of the higher alkylene oxides. This preferential reaction of alkylene oxides with primary hydroxyl groups provides the basis for a continuous process embodiment of the invention using alkylene oxides having at least 3 carbon atoms in which the first stage of the process need only be carried out once and, thereafter, the desired adduct which is needed as a solvent for the second stage and high molecular weight oxyalkylation products are produced continuously in separate reaction zones.

The catalyst that is used is an amine catalyst that generates secondary hydroxyl groups when the oxirane ring of higher alkylene oxides is opened. The concentration of catalyst in any stage of the process depends on the molecular weight of product that is desired.

The first stage of the process is carried out using water as a solvent for the polyol. Only that amount of water need be used that permits agitation or mixing and contacting of the solid polyol with catalyst and alkylene oxide. It is not necessary that the polyol be completely dissolved in the water. The amount of water used should be that amount which permits a significant amount, such as approximately 2 to 10 weight percent, of the polyol to dissolve in the water. It will be satisfactory, of course, if a greater proportion of the polyol dissolves in the water, but it is desirable to keep the amount of water used at a minimum. This amount of water will dissolve a sufficient amount of the polyol and produce a stirrable mixture to facilitate the reaction with the alkylene oxide reactant. The reaction with the alkylene oxide proceeds in the aqueous solution phase of the mixture and, as the alkylene oxide reacts with the polyol in the aqueous solution phase, an additional amount of polyol dissolves in the aqueous solution phase to permit further reaction with the alkylene oxide reactant.

The oxyalkylation temperature employed in the first stage of the process is from about 85° C. to 135° C. and preferably from 90° C. to 125° C. A relatively low temperature is employed in order to minimize reaction of the alkylene oxide with water in the system. The broad temperature range for oxyalkylation reactions is about 85° C. to 170° C., on the other hand. The lower oxyalkylation temperature is effective for producing the adduct of 0.5 to 1.5 moles per hydroxyl group of the polyol of alkylene oxide and the polyol. When this adduct has been formed, the adduct is stripped in a vacuum stripping operation and subsequent reaction of fresh polyol and alkylene oxide is carried out at conventional oxyalkylation temperatures, such as about 120 to 150° C.

All of the reactions carried out in the process of this invention are carried out in closed reaction zones and the pressure need only by the autogenous pressure developed by the reactants under the conditions of the reaction. The reaction zone is purged with nitrogen or any other inert gas to remove air containing oxygen from the system, as is conventional in oxyalkylation reactions, because the polyol and the polyol adduct are oxidized to aldehydes and colored polymers if oxygen is present under the conditions of the oxyalkylation reaction.

The reaction time for the first or any subsequent stage of the process is that time required for introducing the proper amount of alkylene oxide to the system while controlling the reaction temperature at the desired level. Oxyalkylation reactions are exothermic and so the alkylene oxide must be introduced at a controlled rate so that the desired reaction temperature is not exceeded. When the pressure of the reaction system falls to and remains at a constant value after all of the alkylene oxide reactant has been introduced, the reaction is complete.

As has been pointed out, the proportion of alkylene oxide to polyol that is employed in the first stage is very important. Desirably the lowest proportion of alkylene oxide should be used that produces an adduct with the polyol having a sufficiently reduced melting point such that it can act as a solvent and reaction medium for further reaction of fresh polyol and additional alkylene oxide.

The process of the invention is further described by the following examples which are supplied in order to illustrate the process.

Example 1

A steam-heated autoclave reactor is charged with 816 grams (6 moles) of pentaerythritol, 12 grams of tetramethylbutanediamine and 405.7 grams of distilled water. The autoclave is purged three times with nitrogen gas and then heated to 110° C.

Propylene oxide is then introduced into the autoclave and 696 grams (12 moles) of propylene oxide are introduced over a period of about 3⅓ hours. The maximum pressure developed by the reactants is about 40 p.s.i.g. and the reactants are heated and sirred at 110° C. for about 25 minutes after the propylene oxide is completely added to the autoclave.

Thereafter, the reaction mixture is cooled to 40° C. and the liquid product containing no suspended solid material is blown into a clean glass vessel. The product is stripped at 5 mm. Hg pressure at 125–126° C. for about 2½ hours. After cooling, the product is a clear liquid containing only a small amount of solid precipitate.

The product of the first stage of the run is an adduct of 2 moles of propylene oxide and pentaerythritol having a molecular weight of 252.

The pentaerythritol-propylene oxide adduct, prepared as described above, is employed as the solvent and reaction medium for further reaction of fresh pentaerythritol and propylene oxide. The adduct is charged to the autoclave and 454 grams (1.8 moles) of the pentaerythritol-propylene oxide adduct and 408 grams (3 moles) of fresh pentaerythritol are charged to the autoclave. An additional amount of 20 grams of tetramethylbutanediamine is added as catalyst and the reactionn mixture heated and stirred for 30 minutes at 90° C. and then the temperature raised to 135° C. Propylene oxide is then introduced in the amount of 2018 grams (34.8 moles) over a period of about 8 hours.

The product of the reaction between pentaterythritol and propylene oxide, after cooling and stripping is a clear liquid which has a molecular weight of 600 and contains a low amount of diols.

Example 2

Dipentaerythritol and propylene oxied are reacted in the same reaction system as described in Example 1. The amount of dipentaerythritol used is 508 grams (2.0 moles), the amount of water used is 500 grams and the amount of tetramethylbutanediamine catalyst is 4 grams which corresponds to 1.37 moles percent based on the dipentaerythritol.

The reaction with propylene oxide is carried out at 110 to 112° C. and 464 grams (8.0 moles) of propylene oxide are introduced to the reactor over a period of about 3½ hours.

The product is removed from the autoclave and subjected to vacuum stripping to remove water. The product is an adduct of dipentaerythritol and 4 moles of propylene oxide.

The initial adduct of dipentaerythritol and 4 moles of propylene oxide is employed in a second stage as the solvent and reaction medium for further reaction of dipentaerythritol and propylene oxide. There is charged to the autoclave 486 grams (1.0 mole) of the dipentaerythritol-propylene oxide adduct produced in the first stage, 381 grams (1.5 moles) of fresh dipentaerythritol and 22 grams of additional tetramethylbutanediamine catalyst. Propylene oxide is introduced at about 125° C. over a period of 3¾ hours during which time 1651 grams (28.4 moles) of propylene oxide are introduced to the system.

The product is cooled and subjected to vacuum stripping. The product is a liquid having a molecular weight of 980 and containing a low amount of diols.

Example 3

An adduct of 1.6 moles of propylene oxide per mole of trimethylolethane is prepared in the first stage and this adduct is then used as the solvent and reaction medium for preparing the trimethylolethane-propylene oxide reaction product having a molecular weight of 750.

In the first stage, 648 grams (5.4 moles) of trimethylolethane, 400 grams of distilled water and 12 grams (1.9 mole percent) of tetramethylethylenediamine catalyst are charged to the autoclave. 870 grams (15 moles) of propylene oxide are introduced over a period of 3¼ hours at 124 to 126° C.

After cooling and vacuum stripping the product, the product is a yellow liquid having a molecular weight of 210. The theoretical molecular weight of the product is 282.

The adduct if trimethylolethane and 1.6 moles of propylene oxide is used in a second stage by charging 506 grams (2.4 moles) of the adduct and 108 grams (0.9 mole) of trimethylolethane to the autoclave. Additional catalyst in the amount of 20 grams is added. 1636 grams (28.2 moles) of propylene oxide were introduced over a period of 6¼ hours at 124 to 126° C.

After cooling and vacuum stripping the product, the product was a liquid having a molecular weight of 684 and containing a low amount of diols.

Example 4

An adduct of 3 moles of propylene oxide per mole of sorbitol is prepared in the first stage of the process and this adduct is employed as the solvent and reaction medium for producing a reaction product of propylene oxide and sorbitol having a theoretical molecular weight of 874.

In the first stage of the process, 900 grams (4.9 moles) of sorbitol, 500 grams of water and 10 grams (1.73 mole percent based on the sorbitol) of tetramethylethylenediamine catalyst are charged to the autoclave. Propylene oxide is introduced to the autoclave over a period of about 5 hours at 115° C. during which time 870 grams (15.0 moles) of propylene oxide were introduced to the system.

After cooling and vacuum stripping the product, the adduct has a molecular weight of about 330. The product is a clear liquid containing no solid residue on visual inspection.

The adduct prepared as described above is employed as the solvent and reaction medium for further reaction of sorbitol and propylene oxide by charging 712 grams (2.16 moles) of the adduct, 364 grams (2.0 moles) of sorbitol and 6 grams (2.56 mole percent based on the polyol) of additional tetramethylethylenediamine catalyst to the autoclave. Propylene oxide is introduced over a period of 9 hours at 125° C. in the amount of 1384 grams (23.8 moles).

After cooling and vacuum stripping, the product is a liquid having a molecular weight of 620 and having a low amount of diols.

Example 5

A run was carried out for the purpose of oxyalkylating sucrose with propylene oxide wherein the reactor was a steam-heated autoclave. In the first stage the autoclave was charged with 950 grams of sucrose, 3 grams of 1,2,4-trimethylpiperazine and 60 grams of distilled water. The autoclave was purged three times with nitrogen gas and heated to 100° C. 1550 grams of propylene oxide were then introduced over a period of one hour. After one hour the temperature was raised to 115° C. at which temperature the addition was completed under 90 p.s.i.g. The addition of the remaining propylene oxide required 10¼ hours. The reactants were heated to 120° C. and reacted for about 45 minutes after the propylene oxide was completely added to the autoclave. Thereafter, the reaction mixture was cooled to 60° C. and the liquid product was blown into a clean glass vessel.

The product was stripped at a pressure of from 80 mm. Hg to 2 mm. Hg pressure with the pressure decreasing with time over a period of about 5 hours. After cooling, the product was a viscous liquid.

The product of the first stage of the run was an adduct of 26.8 moles of propylene oxide and 2.78 moles of sucrose having a molecular weight of 839.

The sucrose-propylene oxide adduct, prepared in the first stage as described above, was employed as the solvent and reaction medium for further reaction of fresh sucrose and propylene oxide in the second stage. The adduct containing trimethylpiperazine catalyst was charged to the autoclave. 670 grams (0.8 mole) of the sucrose-propylene oxide adduct and 670 grams (1.95 moles) of fresh sucrose were charged to the autoclave. An additional amount of 4 grams 1,2,4-trimethylpiperazine was added as catalyst and the reaction mixture was heated to 115° C. at which point it was vented to 0 p.s.i.g. Propylene oxide was then introduced in the amount of 1260 grams (21.7 moles) over a period of about 8 hours under a maximum pressure of 90 p.s.i.g. and the reaction mixture was then heated to 120° C. and reacted for 45 additional minutes, cooled, and discharged. The product was a liquid which had a molecular weight of 915.

The sucrose-propylene oxide adduct, prepared in the second stage as described above, was employed as the solvent and reaction medium for further reaction of fresh sucrose and propylene oxide in the third stage. The adduct containing trimethylpiperazine catalyst was charged to the autoclave. 670 grams (0.73 mole) of the sucrose-propylene oxide adduct, prepared in the second stage, and 670 grams (1.95 moles) of fresh sucrose were charged to the autoclave. An amount of 4.0 grams tributylamine was added as catalyst and the reaction mixture was heated to 125° C. at which point it was vented to 0 p.s.i.g. Propylene oxide was then introduced in the amount of 1160 grams (20.0 moles) over a period of about 9½ hours under a maximum pressure of 90 p.s.i.g. and then reacted for 45 additional minutes, cooled, and discharged. The product was a liquid which has a molecular weight of 875.

The sucrose-propylene oxide adduct, prepared in the third stage as described above, was employed as the solvent and reaction medium for further reaction of fresh sucrose and propylene oxide. The adduct containing some cataylst was charged to the autoclave. 670 grams (0.765 mole) of the sucrose-propylene oxide adduct, prepared in stage 3, and 670 grams (1.95 moles) of fresh sucrose were charged to the autoclave. An amount of 4.0 grams tributylamine was added as catalyst and the reaction mixture was heated to 125° C. at which point it was vented to 0 p.s.i.g. Propylene oxide was then introduced in the amount of 1160 grams (20.0 moles) over a period of about 8¾ hours under a maximum pressure of 90 p.s.i.g. and was then reacted for 45 additional minutes, cooled and discharged. The product was a liquid which has a molecular weight of 915 and a low percentage of diols.

*Example 6*

A run was carried out for the purpose of oxyalkylating sucrose with propylene oxide wherein the reactor was a steam-heated autoclave. In the first stage, a two-step addition was employed wherein the autoclave was charged with 356 grams of sucrose, 3 grams of tributylamine and 48 grams of distilled water. The autoclave was purged 4 times with nitrogen gas and heated slowly to 115° C. When the temperature reached 90° C., propylene oxide addition was begun. 491 grams of propylene oxide were then introduced over a period of about 7 hours. The addition was completed under a pressure of 90 p.s.i.g. The reactants were reacted for about 3 hours after the propylene oxide was completely added to the autoclave. Thereafter, the reaction mixture was cooled to 100° C. and 356 grams of sucrose added.

The product was stripped at a pressure of less than 10 mm. Hg pressure and a temperature of 130° C. for a period of 1 hour. The vacuum was relieved with nitrogen gas and the material cooled to 100° C.

An additional amount of 7 grams tributylamine was added as catalyst and the reaction mixture was heated to 120° C. at which point it was vented to 0 p.s.i.g. Propylene oxide was then introduced in the amount of 1297 grams over a period of about 5 hours under a maximum pressure of 50 p.s.i.g. When about 400 grams of propylene oxide remained to be added, the material was heated to 150° C. After completion of the propylene oxide addition, the material was reacted until the pressure was constant for 1 hour, after which the product was cooled and discharged. The product was a liquid which had a molecular weight of 1040 and which weighed 2202 grams.

The sucrose-propylene oxide adduct, prepared in the first stage as described above, was employed as the solvent and reaction medium for further reaction of fresh sucrose and propylene oxide in the second stage. The adduct containing the previously added catalyst was charged to the autoclave. 908 grams (0.87 mole) of the sucrose-propylene oxide adduct and 454 grams (1.33 moles) of fresh sucrose were charged to the autoclave. An amount of 7.0 grams N,N,N',N'-tetramethylbutanediamine was added as catalyst and the reaction mixture was heated to 120° C. at which point it was vented to 0 p.s.i.g. Propylene oxide was then introduced in the amount of 1138 grams (19.6 moles) over a period of about 8 hours under a maximum pressure of 90 p.s.i.g. The propylene oxide was added over a period of 4 hours at 120° C., then heated to 150° C. for the remainder of the addition. The material was reacted at 150° C. for 2¼ additional hours, cooled, and discharged. The product of the second stage was a liquid which had a molecular weight of 1040 and which weighed 2456 grams.

The sucrose-propylene oxide adduct, prepared in the second stage as described above, was employed as the solvent and reaction medium for further reaction of fresh sucrose and propylene oxide in the third stage in the same reaction system, and employing the same reactants and proportions as described for the second stage. This was repeated again and again for a total of six stages wherein the product of each previous stage was employed as the solvent and reaction medium for the next succeeding stage. All reaction conditions were the same in each stage with the exception of the propylene oxide addition times and total reaction times which are shown in Table I below.

TABLE I

| Stage | Addition Time, hrs. | Total Reaction Time, hrs. |
|---|---|---|
| 3 | 8 | 9 |
| 4 | 5¾ | 8¾ |
| 5 | 6 | 8½ |
| 6 | 4½ | 8½ |

Each product was a liquid with a molecular weight about 1060 and characterized by a low amount of diols. The weight of each product is shown in Table II.

TABLE II

| Stage: | Weight in grams |
|---|---|
| 3 | 2459 |
| 4 | 2439 |
| 5 | 2440 |
| 6 | 2452 |

Example 7

Sucrose and propylene oxide are reacted in the same reaction system and the same number of stages as Example 6. All reaction conditions are the same in each stage with the exception that N,N,N',N'-tetramethylethylenediamine is substituted for the N,N,N',N'-tetramethylbutanediamine catalyst employed in stages 2–6 of Example 6.

Each product is a liquid with a molecular weight of about 1050 and characterized by a low amount of diols.

Example 8

The sucrose-propylene oxide adduct, prepared in the first stage of Example 6 as described above, was employed as the solvent and reaction medium for further reaction of fresh sucrose and propylene oxide in the second stage. The adduct containing the previously added catalyst was charged to the autoclave. 554 grams (0.532 mole) of the sucrose-propylene oxide adduct and 554 grams (1.62 moles) of fresh sucrose were charged to the autoclave. The reaction mixture was heated to 120° C. and stripped for 1 hour at 120° C. and a pressure of 10 mm. Hg. The vacuum was relieved with nitrogen and an amount of 9 grams tetramethylguanidine was added as catalyst. The material was heated to 120° C. and propylene oxide was introduced in the amount of 1392 grams (24.0 moles) over a period of about 6¾ hours under a maximum pressure of 90 p.s.i.g. The reaction mixture was then heated to 150° C. and reacted for 2 additional hours, cooled, and discharged. The product was a liquid which had a molecular weight of 1066 and a weight of 2422 grams.

The sucrose-propylene oxide adduct, prepared in the second stage as described above, was employed as the solvent and reaction medium for further reaction of fresh sucrose and propylene oxide in the third stage in the same reaction system and employing the same reactants and portions as described for the second stage. This was repeated again and again for a total of seven stages wherein the product of each previous stage was employed as the solvent and reaction medium for the next succeeding stage. All reaction conditions were the same in each stage with the exception of the propylene oxide addition time and total reaction times which are shown in Table III below.

TABLE III

| Stage | Addition Time, hrs. | Total Reaction Time, hrs. |
|---|---|---|
| 3 | 6.0 | 9.7 |
| 4 | 6.0 | 10.25 |
| 5 | 6.0 | 10.5 |
| 6 | 5.75 | 10.0 |
| 7 | 6.0 | 10.25 |

Each product was a liquid with a molecular weight of about 1080 and characterized by a low amount of diols. The weight of each product is shown in Table IV below.

TABLE IV

| Stage | Weight in grams |
|---|---|
| 3 | 2417 |
| 4 | 2443 |
| 5 | 2401 |
| 6 | 2449 |
| 7 | 2454 |

The process of the invention can be expressed as a continuous process in which the alkylene oxide adduct of the solid polyol is continuously prepared in one reaction zone and a portion of that adduct is used in a second reaction zone as the solvent and reaction medium for preparing reaction products of the polyol and alkylene oxide in a system in which no water is present. The higher alkylene oxides having at least 3 carbon atoms should be used when the process is carried out continuously because such alkylene oxides preferentially react with the primary hydroxyl groups of the polyol, itself, instead of the secondary hydroxyl groups in the alkylene oxide adduct of the polyol that is used as the solvent and reaction medium in the first reaction zone.

In order to employ the process of the invention in a continuous system, an alkylene oxide adduct of the solid polyol having proportions of about 0.5 to 1.5 moles of the alkylene oxide per hydroxyl radical of the polyol is prepared, initially, in the same manner that has been described hereinabove, employing a low oxyalkylation temperature and a sufficient amount of water such that a significant amount, e.g. about 2 to 10 weight percent, or more, of the solid polyol is in solution in the water to facilitate reaction with the alkylene oxide. After preparing such adduct, the adduct is placed in a first reaction zone together with a catalytic amount of an oxyalkylation catalyst. The polyol that is to be the basis of the product that is desired (which can be the same as or different from the polyol used to produce the adduct that serves as the reaction medium in the first reaction zone) is passed into the first reaction zone and a stream of the alkylene oxide to be used, such as propylene oxide, is passed into the first reaction zone. The flow rate of the alkylene oxide stream into the first reaction zone is adjusted so that the molar ratio of the alkylene oxide and the additional polyol passing into the first reaction zone is about 0.5 to 1.5 moles of alkylene oxide per hydroxyl radical of polyol. The temperature in the first reaction zone is a relatively low oxyalkylation temperature, such as 85° C. to 135° C., and the reactants in the first reaction zone are mixed and heated to continuously produce an adduct of the polyol and alkylene oxide.

The adduct produced in the first reaction zone is withdrawn from the first reaction zone and separated into a recycle product stream and a second reaction zone polyol feed stream. The recycle product stream is returned to the first reaction zone to serve as the solvent and reaction medium for further preparation of alkylene oxide adduct with the polyol. The portion of the first reaction zone product that is designated the second reaction zone polyol feed stream is passed into a second reaction zone together with a stream of alkylene oxide to produce the desired high molecular weight adduct. Fresh polyol is not added to the second reaction zone since the purpose here is to build up chains of oxyalkylene groups on the polyol adduct that is passed into the second reaction zone as the second reaction zone polyol feed stream. Catalyst can be added to adjust its concentration where required.

The reactants are heated and stirred in the second reaction zone at an oxyalkylation temperature which can be in the range of 110–160° C.

Product from the second reaction zone is withdrawn and subjected to conventional purification steps, such as vacuum stripping, before passing same to storage.

It is believed that the concept of employing a low molecular weight adduct of a normally-solid polyol and an alkylene oxide as the reaction medium and solvent for the polyol, itself, when preparing high molecular weight adducts together with the concept of employing an alkylene oxide having at least 3 carbon atoms so that advantage can be taken of the preferential reaction of such an alkylene oxide with the primary hydroxyl groups of the polyol provide, for the first time, a completely practical process that can be carried out on large scale for producing high molecular weight adducts of normally-solid polyols and alkylene oxides that are substantially free of undesired by-products, such as glycols or polymers of the alkylene oxide that is used.

It is to be understood that various changes and modifications may be made in the foregoing process without

What is claimed is:

1. A process for oxyalkylating a normally solid polyol, which comprises, mixing and heating to from 85° C. to 170° C. in the presence of an amine catalyst (1) a vicinal alkylene oxide, (2) a normally solid organic polyol having 3 to 8 hydroxyl radicals per molecule, and (3) a substantially water-free adduct of a normally solid organic polyol having 3 to 8 hydroxyl radicals per molecule with from 0.5 to 1.5 moles of a vicinal alkylene oxide per hydroxyl radical of said polyol, said organic polyol having a melting point of at least 100° C. and being selected from the group consisting of pentaerythritol, dipentaerythritol, tripentaerythritol, trimethylolethane, inositol, monosaccharides, disaccharides, sorbitol and fructose, said alkylene oxide being selected from the group consisting of ethylene oxide, propylene oxide, 1,2-butylene oxide, 2,3-butylene oxide, isobutylene oxide, butadiene monoxide, styrene oxide, cyclohexene oxide, butadiene dioxide, methyl glycidyl ether, phenyl glycidyl ether and mixtures thereof, said catalyst being selected from the group consisting of tetramethylethylenediamine, tetramethylbutanediamine, tetramethylguanidine, trimethylpiperazine, and tributylamine, the amount of said adduct employed being sufficient so that it is the solvent and reaction medium for the process and the amount of said solid organic polyol that is employed being at least sufficient so that the polyol is oxyalkylated by the vicinal alkylene oxide under the conditions of the process.

2. A process according to claim 1 wherein said polyol (2) is a disaccharide, said adduct (3) is an adduct of a disaccharide and propylene oxide and said alkylene oxide (1) is propylene oxide.

3. A process for oxyalkylating a normally solid polyol, which comprises, contacting a solid organic polyol having from 3 to 8 hydroxyl radicals per molecule with water, an amine catalyst and a vicinal alkylene oxide at from about 85° C. to 135° C. to produce therefrom a polyol-adduct-solvent, said polyol being soluble in the water at least to the extent of about 2 weight percent based on the weight of the water and the molar proportions of said polyol and said alkylene oxide being in the range of about 0.5 to 1.5 moles of said alkylene oxide per hydroxyl radical of said polyol, said polyol having a melting point of at least 100° C. and being selected from the group consisting of pentaerythritol, dipentaerythritol, tripentaerythritol, trimethylolethane, inositol, monosaccharides, disaccharides, sorbitol, and fructose, said alkylene oxide being selected from the group consisting of ethylene oxide, propylene oxide, 1,2-butylene oxide, 2,3-butylene oxide, isobutylene oxide, butadiene monoxide, styrene oxide, cyclohexene oxide, butadiene dioxide, methyl glycidyl ether, phenyl glycidyl ether and mixtures thereof, and said catalyst being selected from the group consisting of tetramethylethylenediamine, tetramethylbutanediamine, tetramethylguanidine, trimethylpiperazine and tributylamine, removing water from said polyol-adduct-solvent, adding and mixing additional amounts of a solid organic polyol, hereinabove defined, and a vicinal alkylene oxide, hereinabove defined, to and with said polyol-adduct-solvent in the presence of an amine catalyst, hereinabove defined, at from 85° C. to 170° C., the additional amounts of said polyol and vicinal alkylene oxide added to said polyol-adduct-solvent being sufficient to enable the preparation of an oxyalkylated solid organic polyol having the desired molecular weight.

4. A process for oxyalkylating a normally solid polyol, which comprises, contacting a solid polyol having from 3 to 8 hydroxyl radicals per molecule with water, an amine catalyst and a vicinal alkylene oxide at from 90° C. to 125° C. to produce therefrom a polyol-adduct-solvent, said polyol being soluble in the water at least to the extent of about 2 weight percent based on the weight of the water and the molar proportions of said polyol and said alkylene oxide being in the range of about 0.5 to 1.5 moles of said alkylene oxide per hydroxyl radical of said polyol, said polyol having a melting point of at least 100° C. and being selected from the group consisting of pentaerythritol, dipentaerythritol, tripentaerythritol, trimethylolethane, inositol, monosaccharides, disaccharides, sorbitol and fructose, said alkylene oxide being selected from the group consisting of ethylene oxide, propylene oxide, 1,2-butylene oxide, 2,3-butylene oxide, isobutylene oxide, butadiene monoxide, styrene oxide, cyclohexene oxide, butadiene dioxide, methyl glycidyl ether, phenyl glycidyl ether and mixtures thereof, and said catalyst being selected from the group consisting of tetramethylethylenediamine, tetramethylbutanediamine, tetramethylguanidine, trimethylpiperazine and tributylamine, removing water from said polyol-adduct-solvent, adding and mixing additional amounts of said polyol and said alkylene oxide to and with said polyol-adduct-solvent in the presence of said amine catalyst at from about 110° C. to 160° C., the additional amounts of said polyol and alkylene oxide added to said polyol-adduct-solvent being sufficient to enable the preparation of an oxyalkylated solid organic polyol.

5. A process for oxypropylating sucrose, which comprises, mixing and heating in the presence of an amine catalyst, selected from the group consisting of tetramethylethylenediamine, tetramethylbutanediamine, tetramethylguanidine, trimethylpiperazine and tributylamine at from 85° C. to 135° C. propylene oxide and sucrose in a substantially water-free sucrose-adduct-solvent, said sucrose-adduct-solvent consisting essentially of an adduct of sucrose and propylene oxide in the proportion of about 0.5 to 1.5 moles propylene oxide per hydroxyl radical of said sucrose.

6. A continuous process for oxyalkylating a normally solid polyol, which comprises, heating and mixing at from 85° C. to 130° C. in the presence of an amine catalyst, a vicinal alkylene oxide, water and a solid organic polyol having 3 to 8 hydroxyl radicals per molecule and a melting point of at least 100° C., the proportions of water and said polyol being such as to produce a stirrable slurry of polyol and alkylene oxide in water and to dissolve in the water at least 2 weight percent, based on the weight of water, of said polyol and proportions of said polyol and said alkylene oxide being about 0.5 to 1.5 moles of said alkylene oxide per hydroxyl radical of said polyol, thereby producing a polyol-adduct-solvent, said solid organic polyol being selected from the group consisting of pentaerythritol, dipentaerythritol, tripentaerythritol, trimethylolethane, inositol, monosaccharides, disaccharides, sorbitol and fructose, said alkylene oxide being selected from the group consisting of ethylene oxide, propylene oxide, 1,2-butylene oxide, 2,3-butylene oxide, isobutylene oxide, butadiene monoxide, styrene oxide, cyclohexene oxide, butadiene dioxide, methyl glycidyl ether, phenyl glycidyl ether and mixtures thereof, said catalyst being selected from the group consisting of tetramethylethylenediamine, tetramethylbutanediamine, tetramethylguanidine, trimethylpiperazine, and tributylamine, removing water from said polyol-adduct-solvent, transferring said polyol-adduct-solvent into a first reaction zone together with a catalytic amount of said amine catalyst, passing additional amounts of said polyol and said alkylene oxide into said first reaction zone in the proportion of from 0.5 to 1.5 moles of alkylene oxide per hydroxyl radical of said polyol while withdrawing from said first reaction zone a first reaction zone product stream subsequently defined, heating to 85° C. to 135° C. and stirring in said first reaction zone the polyol-adduct-solvent, catalyst, polyol and alkylene oxide to produce an adduct of said polyol and said alkylene oxide, withdrawing from said first reaction zone said last-mentioned adduct as the aforementioned first reaction zone product stream, separating said first reaction zone product stream into a recycle product stream and a second reaction zone polyol feed stream, returning said recycle product stream to said first reaction zone to serve as said polyol-adduct-solvent therein, passing into a second reaction zone said second reaction zone polyol feed stream and a stream of said alkylene oxide and stirring and heating same to 110° C. to 160° C. in the presence of a catalytic amount of said amine catalyst, the proportions of said last-mentioned alkylene oxide stream and second reaction zone polyol feed stream being such as to produce the desired oxyalkylated polyol.

References Cited

UNITED STATES PATENTS

| 2,902,478 | 9/1959 | Anderson | 260—209 |
| 2,927,918 | 3/1960 | Anderson | 260—209 |
| 3,167,538 | 1/1965 | Kaiser et al. | 260—210 |
| 3,190,927 | 6/1965 | Patton et al. | 260—209 |

LEWIS GOTTS, *Primary Examiner.*

J. R. BROWN, *Assistant Examiner.*